3,344,157
16β-METHYL-6-HALO-6-DEHYDRO CORTICAL HORMONES
Mercedes Velasco, Carl Djerassi, Howard J. Ringold, and Albert Bowers, Mexico City, Mexico, assignors, by mesne assignments, to Syntex Corporation, a corporation of Panama
No Drawing. Filed July 10, 1959, Ser. No. 826,120
Claims priority, application Mexico, Oct. 24, 1958, 52,510
17 Claims. (Cl. 260—397.45)

The present invention relates to a new method for preparing certain cyclopentano perhydro phenanthrene derivatives.

More particularly, the present invention relates to a new method for preparing certain 6-halo-6-dehydro cortical hormones, more specifically the 6-fluoro-6-dehydro and 6-chloro-6-dehydro derivatives of cortisone, hydrocortisone, prednisone and prednisolone, which may have a hydroxyl, acyloxy or methyl group at C–16α or a ketal or acetal group at C–16α, 17α and/or a fluorine atom at C–9α, esterified or not at C–21 with any hydrocarbon carboxylic acid of up to 12 carbon atoms. These compounds are disclosed and claimed in copending U.S. application Ser. No. 826,121, filed as of even date herewith now abandoned.

By the method of the present invention, there were also prepared the novel 16β-methyl-6-halo(fluoro or chloro)-6-dehydro derivatives of cortisone, hydrocortisone, prednisone and prednisolone, which may be fluorinated at C–9α and/or esterified at C–21 with any hydrocarbon carboxylic acid of up to 12 carbon atoms. These compounds exhibit the desired mineralocorticoid effect and show glycogenic, eosinopenic, thymolytic and anti-inflammatory activity, and are represented by the following formula:

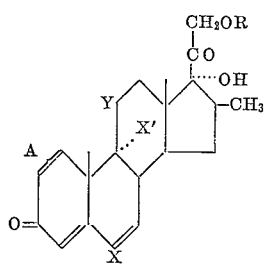

In this formula A represents a single or double bond at C–1; X represents fluorine or chlorine; X′ represents hydrogen or fluorine; Y represents =O or

and R represents hydrogen or a hydrocarbon carboxylic acid acyl group of up to 12 carbon atoms, saturated or unsaturated, of straight, branched, cyclic or mixed cyclic-aliphatic chain, which may be substituted with functional groups such as hydroxyl, O-acyl (acyl as specified above), alkoxy (up to 5 carbon atoms) or halogen, such as fluorine or chlorine for example; typical such esters are, among others, the acetates, propionates, t-butyrates, hemisuccinates, enanthates, caproates, benzoates, trimethylacetates, phenoxyacetates, cyclopentylpropionates and β-chloropropionates.

The following equation illustrates the novel process of the present invention:

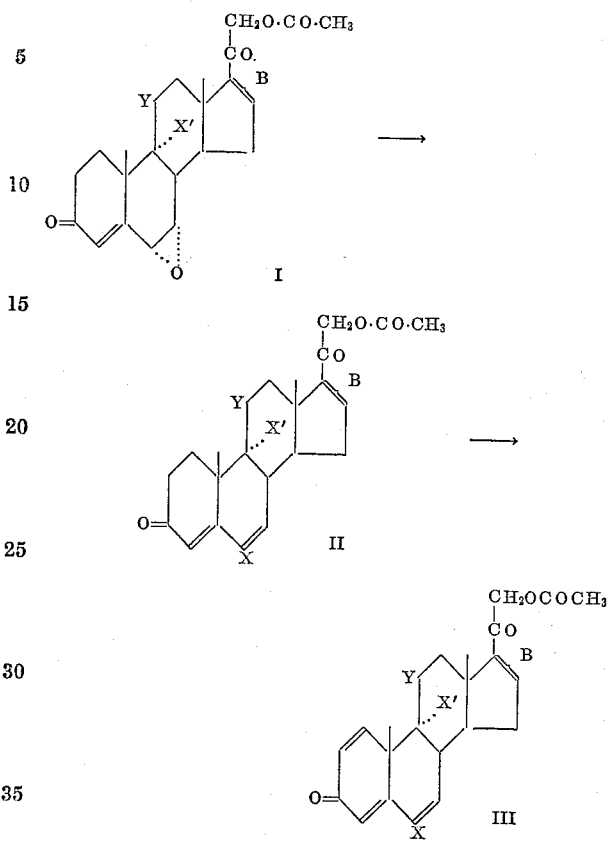

In this equation X, X′, Y represent the same groups as heretofore set forth; B represents 17α-hydroxy, 16α, 17α-dihydroxy, 16α-acyloxy-17α-hydroxy (wherein acyl means a group such as the ones defined above as R), 16β-methyl-17α-hydroxy, 16α-methyl-17α-hydroxy or a cyclic ketal or acetal at C–16α, 17α. In the case of such 16α, 17α-ketals or -acetals B represents

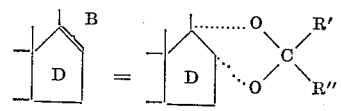

wherein R′ and R″ represent hydrogen or hydrocarbon carboxylic acid acyl groups which may be aliphatic, aromatic or mixed aliphatic-aromatic, having up to 8 carbon atoms. Typical such ketals are, among others, those formed with acetone (acetonides), with methylethylketone, butanone or cyclohexanone; typical acetals are those formed with formaldehyde, acetaldehyde, benzaldehyde or furfural.

In practicing the process heretofore set forth, there were used as starting materials the 21-acetates 6α, 7α-epoxides of cortisone (X′=H; Y=O=; B=17α-hydroxy) of 9α- fluoro-cortisone (X'=F; Y=O=; B=17α-hydroxy), of 9α-fluoro-hydrocortisone (X'=F; Y=

B=17α-hydroxy) as well as their derivatives substituted at C-16 as heretofore set forth. The preparation of such starting material is reported under the heading "Preparations" hereunder; for the sake of clarity we also include the preparations of starting compounds already described in the literature.

For preparing the 6-fluoro compounds the epoxides were treated with hydrogen fluoride in mixture with tetrahydrofurane and chloroform at low temperature, and the resulting 6β-fluoro-7α-hydroxy fluorohydrin was subsequently dehydrated by the action of dry hydrogen chloride in glacial acetic acid solution. For preparing the 6-chloro compounds there was no need of two separate operations since the opening of the epoxide ring and the dehydration were effected in one step upon treatment of the starting epoxide with dry hydrogen chloride in glacial acetic acid solution.

The 11β-hydroxy compounds unsubstituted at C–9α comprised in the above formula (II; Y=β-hydroxy; X=hydrogen) were prepared by reducing the 11-keto group of the respective 3,11,20-triones; by reaction with semicarbazide hydrochloride there were formed the 3,20-bis-semicarbazones, and the 11-keto group was reduced to the 11β-hydroxyl group by reaction with a double hydride, preferably sodium borohydride. Since this reaction also causes the hydrolysis of the esterified groups, the hydroxyl group at C–21 was reacetylated by treatment with acetic anhydride in pyridine solution; finally the semicarbazone groups were hydrolyzed preferably by reaction with pyruvic acid.

A double bond was introduced at C–1 of all of the above 6-halo-Δ$^{4,6}$-compounds by refluxing with selenium dioxide and thus we obtained the 21-acetates or the 16,21-diacetates, respectively, of the trienes illustrated by the Formula III.

The acetoxy groups were hydrolyzed by treatment with a dilute methanol solution of potassium hydroxide or sodium methoxide, at low temperature and under an atmosphere of nitrogen; the hydroxyl group at C–21 or at C–16 and C–21 were reesterified with radicals of any of the carboxylic acids hereinbefore described, by reaction with the respective anhydride in pyridine solution.

The method of the present invention can be modified within wide limits, both with respect to the reagents and solvents employed as with respect to the conditions of temperature and time under which the reactions are carried out. For example, the chlorine atom at C–6 can be introduced in two stages by first forming the 6β-chloro-7α-hydroxy chlorohydrin, for example by reaction with dry hydrogen chloride in chloroform at low temperature, and then dehydrating by treatment with dry hydrogen chloride in acetic acid solution; the treatment with dry hydrogen chloride can be substituted by a treatment with any other acid sufficiently strong to cause the dehydration, such as perchloric acid; in the dehydrogenation with selenium dioxide, t-butanol may be substituted by another solvent, such as chlorobenezne, or there may be used another tertiary alcohol with any basic catalyst, such as collidine; the double bond at C–1 can also be introduced by microbiological methods, such as incubation with Corynebacterium simplex ATCC 6946.

The following specific examples serve to illustrate but are not intended to limit the present invention.

PREPARATION 1

A solution of 7.5 g. of 6-dehydrocortisone-21-acetate in 500 cc. of methylene chloride was treated with 375 cc. of a 5.5% solution of monoperphthalic acid in ether (6 molar equivalents); the mixture was kept for 24 hours at room temperature and then washed with 5% sodium carbonate solution and water, dried over anhydrous sodium sulfate and concentrated until crystallization started. After cooling the precipitate was collected by filtration and air dried. There was thus obtained 6α,7α-oxido-Δ$^4$-pregnene-17α,21-diol-3,11,20-trione 21-acetate, M.P. 265–268° C.; λ$_{max}$ 240–2 mμ, log ε 4.13.

PREPARATION 2

A mixture of 5 g. of 9α-fluoro-cortisone 21-acetate, 100 cc. of xylene and 4 g. of chloranil was refluxed for 12 hours, cooled, diluted with 200 cc. of ether and washed with 2% sodium hydroxide solution and water, dried over anhydrous sodium sulfate and evaporated to dryness under reduced pressure. The residue was purified by chromatography, thus yielding 9α-fluoro-6-dehydro-cortisone 21-acetate.

By subsequent reaction with monoperphthalic acid, in accordance with the procedure described in the previous preparation, there was obtained 9α-fluoro-6α,7α-oxido-Δ$^4$-pregnene-17α,21-diol-3,11,20-trione 21-acetate.

PREPARATION 3

A solution of 5 g. of 9α-fluoro-16α-methyl-hydrocortisone 21-acetate in 50 cc. of anhydrous dioxane was treated with 6 cc. of ethyl orthoformate and 180 mg. of p-toluenesulfonic acid and the mixture was stirred at room temperature for 40 minutes; under stirring there was then added 15 cc. of pyridine followed by 600 cc. of water and the product was extracted with ether. The ether extract was washed with water, dried over anhydrous sodium sulfate and evaporated to dryness, thus giving 16α-methyl-9α-fluoro-3-ethoxy-Δ$^{3,5}$-pregnadiene-11β,17α,21-triol-20-one 21-acetate.

A mixture of 4 g. of the above compound, 120 cc. of acetone and 20 cc. of water was cooled to 0° C. and treated with 4 g. of N-bromosuccinimide and then with 2.2 g. of glacial acetate acid; the mixture was stirred for 3 hours at a temperature between 0 and 5° C., then ice was added and the mixture was kept overnight in the refrigerator. The precipitate formed was collected, washed with water, dried under vacuum and recrystallized from acetone-hexane, in the presence of a few drops of pyridine. There was thus obtained 6β-bromo-9α-fluoro-16α-methyl-hydrocortisone 21-acetate.

A solution of 3 g. of the above compound in 10 cc. of dimethylformamide was added to a stirred suspension of 1.5 g. of calcium carbonate in 30 cc. of dimethylformamide previously heated nearly to boiling. The mixture was refluxed for 15 minutes, filtered, poured into water and acidified with hydrochloric acid. The precipitate formed was collected, washed to neutral and recrystallized, thus affording 9α-fluoro-16α-methyl-6-dehydro-hydrocortisone 21-acetate.

Subsequent oxidation with monoperphthalic acid, in accordance with the method of Preparation 1, furnished 9α-fluoro-16α-methyl - 6α,7α-oxido-Δ$^4$-pregnene-11β,17α,21-triol-3,20-dione 21-acetate.

PREPARATION 4

In accordance with the methods of Preparations 2 and 3, respectively, there were prepared the 21-acetates 6α,7α-epoxides of 9α-fluoro-6-dehydro-hydrocortisone, of 16α-hydroxy-6-dehydrocortisone, of 16α-hydroxy-6-dehydro-9α-fluoro-cortisone, of 16α-hydroxy-9α-fluoro-6-dehydro-hydrocortisone (the 16α-hydroxy groups may be free or esterifier), of 16α-methyl-6-dehydro-cortisone, of 16β-methyl-6-dehydro-cortisone, of 16β-methyl-9α-fluoro-6-dehydro-hydrocortisone, of 16α-methyl-9α-fluoro-6-dehydrocortisone and of 16β-methyl-9α-fluoro-6-dehydro-cortisone.

PREPARATION 5

A suspension of 6 g. of 16α-hydroxy-cortisone in 150 cc. of acetone was treated dropwise under stirring with 1.5 cc. of 70% perchloric acid and the resulting solution was kept for 30 minutes at room temperature. It was then poured into 5% aqueous sodium bicarbonate solution and the precipitate was filtered, washed with water and dried. There was thus obtained the 16,17-acetonide of 16α-hydroxy-cortisone.

A mixture of 6 g. of the above compound, 48 cc. of pyridine and 7.6 cc. of acetic anhydride was kept overnight at room temperature and then poured into ice water. The precipitate was collected, consisting of 16α,17α-isopropylidenedioxy-Δ⁴-pregnen-21-ol-3,11,20-trione 21-acetate (16,17-acetonide of 16α-hydroxy-cortisone 21-acetate), which was purified by recrystallization from acetone-hexane.

In accordance with the method of Preparation 2, this compound was oxidized to the 21-acetate-16,17-acetonide of 6α,7α-oxido-16α-hydroxy-cortisone.

PREPARATION 6

By following essentially the procedure of the previous preparation, there were condensed the 16α,17α-hydroxyl groups of 16α-hydroxy-cortisone with other ketones and aldehydes, as specified in the introduction of the present application. There were thus obtained, among other compounds, the 16,17-cyclic ketals formed with methylethylketone, butanone and cyclohexanone, as well as the 16,17-cyclic acetals formed with formaldehyde, acetaldehyde, benzaldehyde and furfural; the hydroxyl group at C–21 was acetylated. By any of the method of Preparation 2 or 3 there was introduced the 6,7-oxido group and there were obtained the 21-acetates of the respective 16,17-ketals or 16,17-acetals of 6,7-oxido-16α-hydroxy-cortisone.

PREPARATION 7

In accordance with the method of Preparations 5 and 6, there were prepared the 21-acetates-16,17-ketals and -16,17-acetals of all of the other 6α,7α-oxido-Δ⁴-pregnene-16α,17α,21-triol-3,11,20-triones and 6α,7α-oxido-Δ⁴-pregnene-11β,16α,17α,21-tetrol-3,20-diones which can be employed as starting compounds.

*Example 1*

A solution of 5 g. of 6α,7α-oxido-Δ⁴-pregnene-17α,21-diol-3,11,20-trione 21-acetate in 400 cc. of anhydrous chloroform was cooled in a Dry Ice-acetone bath to −70° C. and then a mixture of 11.6 cc. of anhydrous tetrahydrofurane and 8 g. of anhydrous hydrogen fluoride was slowly added under stirring. The mixture was allowed to reach room temperature, kept for 20 hours, and poured into 3 l. to a 5% aqueous potassium carbonate solution mixed with ice, with vigorous stirring; the cholorform layer was washed with water to neutral, dried over anhydrous sodium sulfate and evaporated to dryness. The residue consisted of the crude 6β-fluoro-7α-hydroxy-cortisone 21-acetate which was purified by chromatography on silica. There was thus obtained the pure compound, M.P. 250° C., $\lambda_{max}$. 230–2 m$\mu$, log $\epsilon$ 4.07.

A mixture of 3 g. of the above compound and 150 cc. of glacial acetic acid was treated with a slow stream of dry hydrogen chloride until saturation and then the container was stoppered and kept at room temperature for 24 hours; after pouring into ice cold salt water the product was extracted with methylene chloride and the extract was washed with 5% aqueous sodium carbonate solution and water, dried over anhydrous sodium sulfate and evaporated to dryness, thus leaving as a residue 6-fluoro-6-dehydro-cortisone 21-acetate.

*Example 2*

A slow stream of dry hydrogen chloride was introduced into a suspension of 4.77 g. of 6α,7α-oxido-Δ⁴-pregnene-17α,21-diol-3,11,20-trione 21-acetate (prepareed in accordance with Preparation 1) in 250 cc. of glacial acetic acid. After a short time all the solid material entered in solution and the treatment with hydrogen chloride was continued for a total of 5 hours. The mixture was concentrated to one third of its volume, under reduced pressure and without heating, and then poured into ice water; the precipitate was collected, washed with water to neutral, dried and recrystallized from acetone-ether. There was thus obtained 6-chloro-6-dehydro-cortisone 21-acetate, M.P. 190–200° C. [α]$_D$+228° (dioxane), $\lambda_{max}$. 262 m$\mu$, log $\epsilon$ 4.28; by chromatography of the mother liquors on 30 times the weight of silica there was obtained an additional quantity of the same material plus a smaller amount of 6β-chloro-7α-hydroxy-cortisone 21-acetate, M.P. 229–231° C., as by-product.

*Example 3*

In accordance with the methods of the previous examples, the respective 6α,7α-epoxides were converted into the 21-acetate of the 6-halo(fluoro or chloro)-6-dehydro derivatives of 9α-fluoro-cortisone, 9α-fluoro-hydrocortisone, 16α-hydroxy-cortisone, 16α-acyloxy-cortisone, 9α-fluoro-16αhydroxy-cortisone, 9α-fluoro-16α-acyloxy-cortisone, 9α-fluoro-16α-hydroxy-hydrocortisone, 9α-fluoro-16α-acyloxy-hydrocortisone, 16α-methyl-cortisone, 16α-methyl-9α-fluoro-cortisone, 16β-methyl-cortisone, 16β-methyl-9α-fluoro - cortisone, 16α - methyl-9α-fluoro-hydro cortisone, 16β-methyl-9α-fluoro-hydrocortisone, as well as of the 16,17-ketals and acetals of 16α-hydroxy-cortisone, 16α-hydroxy-9α-fluoro-cortisone and of 16α-hydroxy-9α-fluoro-hydrocortisone.

*Example 4*

A mixture of 4 g. of 6-fluoro-6-dehydro-cortisone 21-acetate, prepared as described in Example 1, 90 cc. of ethanol, 2 g. of semicarbazide hydrochloride and 1.5 g. of anhydrous sodium acetate was refluxed for 48 hours, poured into ice water and the reaction product was extracted wtih ethyl acetate. The extract was washed with aqueous concentrated sodium bicarbonate solution and water, dried over anhydrous sodium sulfate and evaporated to dryness under reduced pressure, adding a few drops of pyridine, thus yielding the 3,20-bis-semicarbazone of 6-fluoro-6-dehydro-cortisone 21-acetate.

A solution of 5 g. of the above compound in 100 cc. of tetrahydrofurane was treated with a solution of 2 g. of sodium borohydride in 50 cc. of water and kept overnight at room temperature; 1 g. more of sodium borohydride in 5 cc. of water was added and the mixture was refluxed for 1 hour and cooled; the excess of hydride was destroyed with acetic acid, a few drops of pyridine were added and the tetrahydrofurane was removed by distillation. The residue was cooled, water was added and the product was extracted with ethyl acetate. The extract was washed with water, dried over anhydrous sodium sulfate and evaporated to dryness under reduced pressure. Recrystallization from aqueous methanol containing a little pyridine afforded the 3,20-bis-semicarbazone of 6-fluoro-6-dehydro-hydrocortisone.

A mixture of 4 g. of the above compound, 20 cc. of pyridine and 4 cc. of acetic anhydride was kept overnight at room temperature, poured into ice water and the precipitate was collected, washed with water and dried. There was thus obtained the crude 3,20-bis-semicarbazone 21-acetate of 6-fluoro-6-dehydro-hydrocortisone. The crude compound was suspended in a mixture of 20 cc. of glacial acetic acid and 5 cc. of water, treated with 3.5 cc. of 50% pyruvic acid and the mixture was stirred at room temperature for 48 hours. There was then added under vigorous stirring 20 cc. of water and the mixture was kept in the refrigerator for 2 hours and diluted with water. The precipitate formed was collected, washed with water, dried and recrystallized from acetone-hexane. There was thus obtained 6-fluoro-6-dehydro-hydrocortisone 21-acetate.

*Example 5*

Exactly as described in the previous example, there was formed the 3,20-bis-semicarbazone of 6-chloro-6-dehydro-cortison 21-acetate; the 11-keto group was reduced by the reaction with sodium borohydride, the hydroxyl group at C–21 was reacetylated and the semicarbazone groups were hydrolyzed, thus producing 6-chloro-6-dehydro-hydro-cortisone 21-acetate.

*Example 6*

By applying the method of Example 4 to the 21-acetates of the 6-halo(fluoro or chloro) derivatives of 16α-methyl-6-dehydro-cortisone, there were obtained the 21-acetates of the respective 6-halo derivatives of 16α-methyl-6-dehydro-hydrocortisone; from the 21-acetates of the 6-halo derivatives of 16β-methyl-6-dehydro-cortisone there were obtained the 21-acetates of the respective 6-halo-16β-methyl-6-dehydro-hydrocortisones; from the 16α-hydroxy- or 16α-acyloxy compounds there were obtained the 16α,21-diacetates of the respective 6-halo-16-hydroxy-6-dehydro-hydrocortisones.

*Examples 7*

In accordance with the method described in Example 4, there was formed the 3,20-bis-semicarbazone of the 16,17-(formaldehyde)-acetal 21-acetate of 6-fluoro-16α-hydroxy-6-dehydro-cortisone; the latter compound was reduced to the 3,20-bis-semicarbazone of the 16,17-(formaldehyde)-acetal of 6-fluoro-16α-hydroxy-6-dehydro-hydrocortisone and the hydroxyl group at C–21 was reacetylated. For the hydrolysis of the semicarbazone groups, the resulting 21-acetate 3,20-bis-semicarbazone of the 16,17-(formaldehyde)-acetal of 6-fluoro-6-dehydro-hydrocortisone, was treated with pyruvic acid in mixture with aqueous acetic acid at room temperature for 48 hours, using the same proportions of reagents as indicated in Example 5. The produce was isolated by the method of that example and thus there was obtained the 21-acetate of the 16,17-(formaldehyde)-acetal of 6-fluoro-6-dehydro-hydrocortisone.

*Example 8*

The method of the previous example was applied to other 16,17-acetals and 16,17-ketals of 6-halo(fluoro or chloro)-6-dehydro-16α-hydroxy-cortisones, for example to the 21 acetates of 16α,17α-cyclohexyldioxy-6-fluoro-$\Delta^{4,6}$-pregnadien-21-ol-3,11,20-trione, to produce finally the 21-acetate of 16α,17α-cyclohexyldioxy-6-fluoro-$\Delta^{4,6}$-pregnadiene-11β,21-diol-3,20-dione, (16,17-(cyclohexanone) ketal of 6-fluoro-6-dehydro-16α-hydroxy-hydrocortisone 21-acetate).

*Example 9*

A mixture of 1 g. of 6-fluoro-6-dehydro-cortisone 21-acetate, 50 cc. of t-butanol, 100 m. of selenium dioxide and 2 drops of pyridine was refluxed for 18 hours under an atmosphere of nitrogen and filtered through celite. The filtrate was evaporated to dryness under reduced pressure, the residue was dissolved in acetone, refluxed with decolorizing charcoal, the acetone was evaporated and the product was purified by chromatography on neutral alumina. There was thus obtained 6-fluoro-$\Delta^{1,4,6}$-pregnatriene-17α,21-diol-3,11,20-trione 21-acetate.

*Example 10*

By the procedure of the previous example there was introduced an additional double bond into all of the final compounds of Examples 2–8. Thus there were prepared, among other compounds, the 21-acetate of 6-chloro-$\Delta^{1,4,6}$-pregnatriene-11β,17α,21-triol-3,20-dione, of 6-fluoro-$\Delta^{1,4,6}$-pregnatriene-17α,21-diol-3,11,20-trione, of 16β-methyl-6-fluoro-$\Delta^{1,4,6}$-pregnatriene-11β,17α,21-triol-3,20-dione, of 16α-propionoxy-6-chloro-$\Delta^{1,4,6}$-pregnatriene-17α,21-diol-3,11,20-trione, of the 16,17-acetonide of 6,9α-difluoro-$\Delta^{1,4,6}$-pregnatriene-11β,16α,17α,21-tetrol-3,20-dione and of the 16,21-diacetate of 6-chloro-$\Delta^{1,4,6}$-pregnatriene-11β,16α,17α,21-tetrol-3,20-dione.

*Example 11*

1 g. of 6-fluoro-6-dehydro-cortisone 21-acetate was treated with 50 cc. of a methanol solution of potassium hydroxide, for 1 hour at 0° C.; the mixture was acidified with acetic acid, concentrated to about 10 cc., under reduced pressure, poured into ice water and the precipitate was filtered, washed with water, dried and recrystallized from acetone-hexane. There was thus obtained the free 6-fluoro-6-dehydro-cortisone.

A mixture of 500 mg. of the above compound, 5 cc. of pyridine and 1 cc. of propionic anhydride was kept overnight at room temperature, poured into water, heated for half an hour on the steam bath and cooled. The precipitate was collected, washed with water, dried and recrystallized from acetone-hexane, thus yielding 6-fluoro-6-dehydro-cortisone 21-propionate.

Upon subsequent dehydrogenation, in accordance with the method of Example 9, there was obtained 6-fluoro-$\Delta^{1,4,6}$-pregnatriene-17α,21-diol-3,11,20-trione 21 - propionate.

*Example 12*

A suspension of 1 g. of 6-chloro-9α-fluoro-16α-hydroxy-6-dehydrocortisone 16,21-diacetate in 10 cc. of absolute methanol was cooled to 0° C., flushed with nitrogen and treated with a solution of sodium methoxide prepared by dissolving 60 mg. of sodium metal in 10 cc. of methanol; the mixture was stirred at a temperature around 0° C. for 1 hour under an atmosphere of nitrogen and then poured into 50 cc. of aqueous saturated sodium chloride solution; the precipitate was collected, washed with a little cold water, dried and recrystallized from acetone-hexane. There was thus obtained the free 6-chloro-9α-fluoro-16α-hydroxy-6-dehydro-cortisone.

A solution of 500 mg. of the above compound in 5 cc. of pyridine was mixed with 1 g. of benzoyl chloride, kept overnight at room temperature, poured into 300 cc. of water, heated for 1 hour on the steam bath, cooled and the precipitate was collected, washed with water, dried and recrystallized from acetone-hexane. There was thus obtained 6-chloro-9α-fluoro-16α-hydroxy-6-dehydro - cortisone 16,21-dibenzoate.

Upon subsequent dehydrogenation, in accordance with the method of Example 9, there was obtained 6-chloro-9α-fluoro-$\Delta^{1,4,6}$-pregnatriene-16α,17α,21-triol-3,11,20 - trione 16,21-dibenzoate.

*Example 13*

In accordance with the method of hydrolysis described in Example 11, there was hydrolyzed the acetoxy group of 2 g. of the 16,17-(butanone)ketal of 6,9α-difluoro-$\Delta^{1,4,6}$-pregnatriene-11β,16α,17α,21-tetrol-3,20-dione 21-acetate.

A solution of 1 g. of the above free compound in 10 cc. of pyridine was mixed with 2 g. of cyclopentylpropionic acid anhydride and kept for 48 hours at room temperature; after pouring into water the mixture was heated for 2 hours on the steam bath and cooled. The precipitate was collected, washed with water, dried and recrystallized from acetone-hexane, thus affording the 16,17(butanone)ketal of 6,9α-difluoro-$\Delta^{1,4,6}$-pregnatriene-11β,16α,17α,21-tetrol-3,20-dione 21-cyclopentylpropionate.

We claim:
1. A compound of the formula

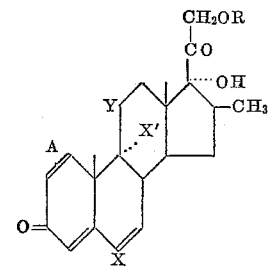

wherein A is selected from the group consisting of a single bond and a double bond, X is selected from the group consisting of chlorine and fluorine, X' is selected from the group consisting of hydrogen and fluorine, Y is selected from the group consisting of =O and

and R is selected from the group consisting of hydrogen and a hydrocarbon carboxylic acid acyl group of up to 12 carbon atoms.

2. 6-fluoro-6-dehydro-16β-methyl-cortisone.

3. The 21-mono hydrocarbon carboxylic acid esters of up to 12 carbon atoms of 6-fluoro-6-dehydro-16β-methyl-cortisone.

4. 6,9α-difluoro-6-dehydro-16β-methyl cortisone.

5. The 21-mono hydrocarbon carboxylic acid esters of up to 12 carbon atoms of 6,9α-difluoro-6-dehydro-16β-methyl cortisone.

6. 6-fluoro-6-dehydro-16β-methyl hydrocortisone.

7. The 21-mono hydrocarbon carboxylic acid esters of up to 12 carbon atoms of 6-fluoro-6-dehydro-16β-methyl hydrocortisone.

8. 6,9α-difluoro-6-dehydro-16β-methyl hydrocortisone.

9. The 21-mono hydrocarbon carboxylic acid esters of up to 12 carbon atoms of 6,9α-diflouro-6-dehydro-16β-methyl hydrocortisone.

10. 6-chloro-6-dehydro-16β-methyl-cortisone.

11. The 21-mono hydrocarbon carboxylic acid esters of up to 12 carbon atoms of 6-chloro-6-dehydro-16β-methyl-cortisone.

12. 6-chloro-9α-fluoro-6-dehydro-16β-methyl-cortisone.

13. The 21-mono hydrocarbon carboxylic acid esters of up to 12 carbon atoms of 6-chloro-9α-fluoro-6-dehydro-16β-methyl-cortisone.

14. 6-chloro-6-dehydro-16β-methyl-hydrocortisone.

15. The 21-mono hydrocarbon carboxylic acid esters of up to 12 carbon atoms of 6-chloro-6-dehydro-16β-methyl-hydrocortisone.

16. 6-chloro-9α-fluoro-6-dehydro-16β-methyl - hydrocortisone.

17. 6-fluoro-16β-methyl-$\Delta^{1,4,6}$-pregnatrien - 11β,17α,21-triol-3,20-dione 21-acetate.

References Cited

Oliveto et al.: J.A.C.S., 80, 6687–88, Dec. 20, 1958.

LEWIS GOTTS, *Primary Examiner.*

LESLIE H. GASTON, *Examiner.*

M. LIEBMAN, E. L. ROBERTS, H. A. FRENCH,
*Assistant Examiners.*